United States Patent

Sibeud

[15] 3,657,922
[45] Apr. 25, 1972

[54] METHOD FOR DETERMINATION OF PERFORMANCE OF A VEHICLE ENGINE

[72] Inventor: Jean Paul Sibeud, Lyon, France
[73] Assignee: Automobiles M. Berliet, Lyon, France
[22] Filed: Dec. 18, 1969
[21] Appl. No.: 886,215

[30] Foreign Application Priority Data

Dec. 19, 1968 France........................179204

[52] U.S. Cl. ..........................................73/117.3
[51] Int. Cl. ...........................................G01m 15/00
[58] Field of Search ..................73/116, 117.3, 117.2

[56] References Cited

UNITED STATES PATENTS

| 3,099,154 | 7/1963 | Vanderbilt, Jr. | 73/117.3 |
| 3,331,200 | 7/1967 | Byron et al. | 58/145 |

Primary Examiner—Jerry W. Myracle
Attorney—Stevens, Davis, Miller & Mosher

[57] ABSTRACT

The method consists of recording on a magnetic tape the electric signal from a detector placed in the vicinity of a rotating member of the engine, the frequency of this signal being proportional to the angular speed of the engine during an acceleration phase at full throttle and a deceleration phase with fuel cut-off and stopping of the engine. The same tape also records the signals from a frequency calibrating device and the whole of the information recorded is treated by a computer adapted to establish various comparative data concerning the angular speeds and the driving and resistive torques of the engine. The device comprises an electro-magnetic detector, an electronic casing with a calibrating oscillator and a tape recorder connected to the electronic casing.

2 Claims, 8 Drawing Figures

METHOD FOR DETERMINATION OF PERFORMANCE OF A VEHICLE ENGINE

The present invention relates to a method for the rapid and accurate determination of the performance of a vehicle engine without any dismantling, and to apparatus for carrying this method into effect.

It is known that the determination of the condition of a vehicle engine may be useful, especially for its maintenance, for the evaluation of second-hand vehicles, for checking before undertaking a long journey, for the requirements of design and for various other reasons.

Known devices are utilized to carry out various checks such as, for example:

Checking of the compression by a compression-meter;
Checking of the injection system of an internal combustion engine by a pump test bench;
Checking of the advance of the injection or the ignition;
Measurement of the spectrum of the engine vibrations;
Analysis of the exhaust gases, etc.

The known checking devices have the disadvantages of immobilizing the vehicle for a relatively long time, of necessitating dismantling by specialized personnel, carried out in a well equipped workshop, and of necessitating the use of expensive apparatus specifically for each particular test.

All the above checks only constitute a verification of the components, without indicating the possible performance of the engine. A complete verification can only be carried out on a suitable test bench and necessitates the removal of the engine. It is for this reason that this is practically never carried out in the utilization of a vehicle.

The present invention has for its object a method for determining the performance of an engine without any dismantling, which makes it possible to carry out the necessary check by non-specialist personnel by means of apparatus of low cost, while the vehicle is only immobilized for a minimum period of time.

A method of this kind is essentially characterized by the fact that there is recorded on a magnetic tape, on the one hand the electric signal emitted by a detector placed in the vicinity of a rotating member of the engine, in such manner that the frequency of this signal is proportional to the angular speed of the engine during an acceleration phase after starting up on full fuel supply and at a maximum angular speed, and during a deceleration phase with fuel supply cut-off and the complete stoppage of the motor caused by a "Stop" control which interrupts the supply of fuel, while on the other hand there are recorded on the same tape the signals emitted by a frequency calibration device, and the measurement informations thus recorded is then transmitted, directly or not, to the peripheries of a computer for treatment.

According to another characteristic feature of the invention, this treatment is effected either in accordance with a general program so as to establish by the peripheries of the computer, graphs and tables of the variation of the angular speeds of the engine and their derivatives, giving the values of the respective engine and resistive torques corresponding to each of the said phases of acceleration and deceleration, and in order to compare them with standard values, or following particular programs so as to establish diagnoses concerning the condition of all or parts of the engine and its surroundings.

In order that the invention may be better understood, there will now be described the principle and the practical operation of the method, together with a construction of a device for carrying it into effect, given by way of non-limitative example, reference being made to the accompanying drawings, in which.

Figure 1:
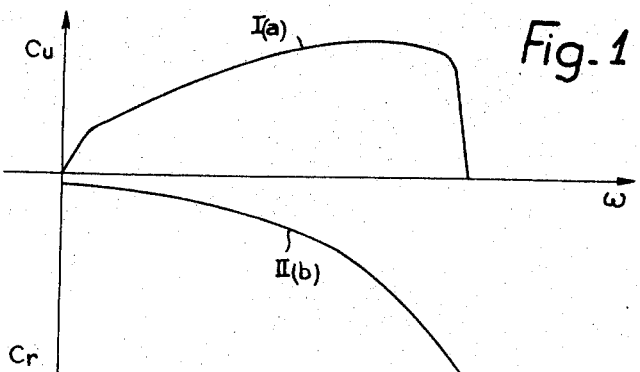
FIG. 1 is a diagram showing the curves of variation of the driving and resistive torques as a function of the angular speed of the engine.

The method according to the invention is based on the fundamental relation of Newton's dynamics, which, for a system in rotation, is expressed by:

$$d\omega/dt = C/Io \qquad (1)$$

in which $\omega$ is the angular speed, $C$ is the torque applied to the system and $Io$ is the moment of inertia of the system with respect to its axis of rotation.

By applying this to a fly-wheel having a moment of inertia $Io$ and subjected to a torque $C$, it can be said that the angular acceleration or deceleration of the fly-wheel is proportional to this torque and inversely proportional to the moment of inertia of the fly-wheel.

In an internal combustion engine, the total inertia of the engine comprises: the inertia of the engine and its accessories, such as fan, pumps, clutch, with the gear-box in neutral. This inertia is invariable for the same type of engine and does not differ from one vehicle to the other of the same type. Therefore, knowing the type of the vehicle, $Io$ is known.

The useful driving torque on the engine shaft is the difference between the driving torque $C_M$ produced by the combustion and the passive resistive torque $C_R$.

$$C_U = C_M - C_R$$

When the basic formula (1) above is applied to the engine, it is always the useful torque which accelerates or slows down the vehicle during normal working.

The driving torque $C_M$ is variable by means of an accelerator acting for example on the control of an injection pump. This control has two extreme positions which are readily obtainable:

a. A first position in which the accelerator pedal is fully pressed down to the floor and the engine torque reaches its maximum possible value:

$$C_M = \text{maximum}.$$

The law of variation of the flow rate of injected fuel then only depends on the characteristics of the injection pump and on the angular speed of the engine shaft. The useful torque is then:

$$C_U = C_M - C_R.$$

As $C_M$ is greater than $C_R$ then $C_U$ is greater than 0.

By applying formula (1) to this position, which corresponds to the acceleration of the engine, we have:

$$d\omega/dt = C_U/Io \text{ from which } C_U = Io\, d\omega/dt = Io\cdot g(t) \qquad (2)$$

in which $g(t)$ is the first differential with respect to time of the angular speed of the engine which is expressed as a function of time $\omega = f(t)$.

b. A second position of stopping the engine or "Stop", in which the injected flow-rate is nil.

The driving torque is then nil; we have: $C_M = 0$, and the useful torque becomes:

$$C_U = 0 - C_R$$

As $C_R$ is always greater than 0, we have $C_U < 0$ and in absolute value:

$$|C_U| = |C_R|.$$

By applying formula (1) to this position $b$ which corresponds to the deceleration of the engine, we have:

$$d\omega/dt = -C_R/Io \text{ from which } -C_R = Io\,(d\omega/dt) = Io\cdot h(t) \qquad (3)$$

in which $h(t)$ is the first differential with respect to time of the angular speed of the engine during deceleration.

Thus, in order to know the useful torque and the resistive torque of an engine, it is only necessary to measure, during the phases $a$ of acceleration and $b$ of deceleration, the variations of the angular speed as a function of the time, $\omega = f(t)$ and to calculate the first differentials $g(t)$ and $h(t)$ of this angular speed with respect to time for the same phases.

Knowing the moment of inertia $Io$, the useful torque $C_U$ and the passive resistive torque $C_R$ can be obtained from the formulae (2) and (3) above.

The results may be shown as a diagram of variation of the torque as a function of the angular speed of the engine, shown in FIG. 1. The useful driving torque $C_U$ is plotted on this diagram in positive ordinates and the passive resistive torque $C_R$ in negative ordinates, the angular speed of the engine being plotted in abscissae. There is thus obtained the curve I for the phase of acceleration $a$ and curve II for the phase $b$ of deceleration.

Figure 2:
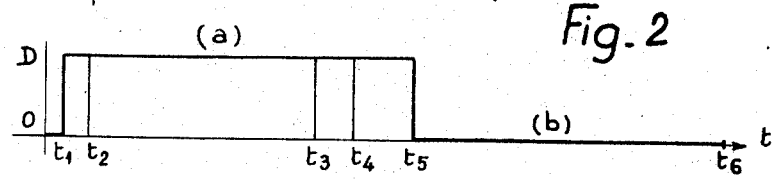
FIG. 2 is a graph showing the theoretical flow rate of fuel in an engine during the measurement.

In order to obtain these torque curves, the following operation is effected, as shown by the theoretical diagram of flow rates of fuel D as a function of time $t$ of FIG. 2.

The engine being at its normal working temperature and stopped, the operator gives the maximum flow rate at the time $t_1$ by depressing the accelerator pedal to the floor and actuating the starter. Starting up is rapid and the engine reaches at $t_3$ its maximum speed which it maintains up to $t_5$. The acceleration phase $a$ is thus obtained from $t_1$ to $t_5$. At $t_5$ the operator actuates a "Stop" control which instantaneously cuts off the fuel supply. The engine continues to rotate from $t_5$ to $t_6$ during the deceleration phase $b$ and stops at $t_6$.

Figure 3:
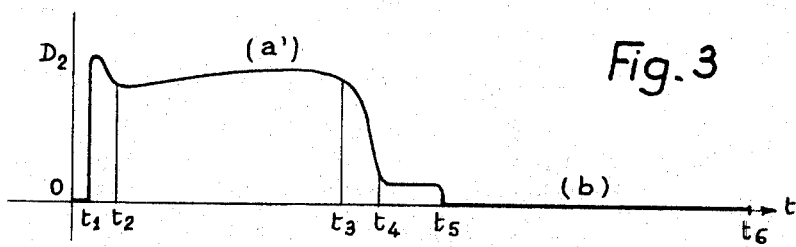
FIG. 3 is a graph showing the real injected flow rate of fuel.

The curve of real flow rate $D_2$ of FIG.3 differs slightly from the theoretical curve of FIG. 2. From $t_1$ to $t_2$ there is a starting up overload and its elimination before the idling speed. From $t_2$ to $t_3$ there is the acceleration of the engine over the normal range of utilization with the maximum flow rate provided by the initial adjustment of the injection pump. From $t_3$ to $t_4$ the action of the maximum speed regulator reduces the flow rate to the value necessary for driving the engine at the maximum speed. From $t_4$ to $t_5$ there is a phase of operation on no-load at maximum speed under the control of the over-speed regulator. The acceleration phase ($a'$) lasts therefore from $t_1$ to $t_5$. At $t_5$ there occurs the action of the "Stop" control which can be effected without lifting the foot from the accelerator pedal; from $t_5$ to $t_6$ there is the phase $b$ with zero flow rate of fuel.

Figure 4:
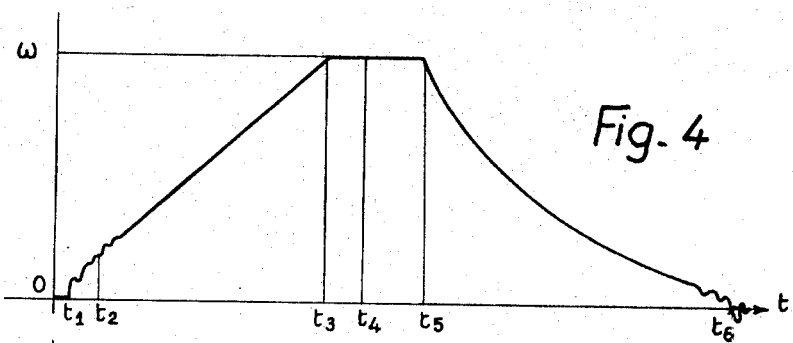
FIG. 4 is a graph showing the variations of the angular speed of the engine during measurement.

During the above periods of time, the angular speeds $\omega$ are recorded, for which FIG. 4 gives the curve of variation as a function of the time $t$.

On the curve of this figure, it is seen that from $t_1$ to $t_2$ the mean slope of the curve is fairly steep due to the overload on starting up. There are observed oscillations due to the variations of total energy of the system caused by the work of compression (absorption of energy) and expansion of combustion (supplement of energy).

From $t_2$ to $t_3$ the engine is accelerated by the maximum useful torque in the normal range of utilization. As this torque is almost constant as a function of the speed, the curve of speeds over this range is very close to a straight line.

From $t_3$ to $t_4$ the useful torque decreases and becomes zero at $t_4$ when the speed is reached at which the overspeed regulator cuts off the supply.

From $t_4$ to $t_5$, the speed is constant and equal to the cut-off speed; there may however be present a few oscillations if the stability of the regulator is not very good.

From $t_5$ to $t_6$, corresponding to phase $b$ of the flow rate, the engine decelerates due to the effect of the passive resistive torque. The speed decreases first of all fairly rapidly due to the resistances caused by the preponderating fluids at high speed (filling and evacuation of the cylinders, fan, water pump, friction of the fluids). The variation of speed then becomes almost linear when the solid friction becomes preponderant. Finally, at the very low speeds, strong oscillations reappear, due solely to the work of compression. The stopping of the engine takes place after an oscillating movement (rotation to the right and to the left) on each side of a compression, when the kinetic energy of the engine becomes smaller than the work of compression.

Figure 5:
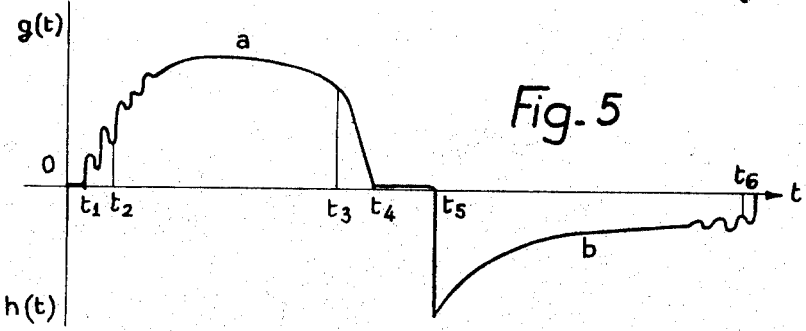
FIG. 5 is a graph showing the variations of the differentials of speed during measurement.

The diagram of FIG. 5 shows the curve of variation of the angular acceleration as a function of the time $g(t)$ for the acceleration phase $a$ and $h(t)$ for the deceleration phase $b$.

There can be seen from this curve, from $t_1$ to $t_2$, the brief action of the starter, the very rapid passage through the range of speeds over which the starting up overload is present, after which the idling speed is reached, followed by normal operation at full load.

On each side of $t_2$, that is to say close to the idling speed, the cyclic irregularities are considerable; there are frequently observed values of the relative variation of speed $\Delta\omega/\omega = 16\%$.

As the power of the engine is:
$$W = \tfrac{1}{2} I o \omega^2$$ we have $$dW = I o \omega d\omega \text{ and } \frac{dW}{W} = \frac{I o \omega d\omega}{\tfrac{1}{2} I o \omega^2} = 2\frac{d\omega}{\omega}$$

It can thus be seen that the measurement of the relative cyclic variations of the angular speed makes it possible to know the relative variations of the energy of the system. It is thus possible to compare the work of compression and of combustion expansion of the various cylinders with each other. If $\Delta \omega/\omega = 16\%$ and can be measured to within $\pm 1\%$, it is possible to compare $\Delta W/W$ for each cylinder to $\pm 1/16$, namely to within $\pm 6\%$.

A comparison with such a degree of accuracy of the energy delivered by the cylinders of an engine is sufficient to make it possible to detect a serious defect in one of them.

This measurement can be made equally well in the acceleration phase $a$ and in the deceleration phase $b$. In phase $a$ in which there is both compression and combustion, the fault can be imputed either to the injection system or to lack of gas-tightness of the cylinder. In phase $b$, in which there is only compression, the fault can be imputed to the lack of gas-tightness of the cylinder.

It can thus be seen that a study of the acceleration makes it possible to determine the cause of a defect.

From $t_2$ to $t_3$, the operation is normal. the measurement of $\omega = f(t)$ and then of $d\omega/dt = g(t)$ makes it possible to obtain the useful torque $C_U$ of the engine in this range.

When $t_3$ is reached, the overspeed regulator of the injection pump comes into action and the points $t_3$, beginning of cut-off, and $t_4$, end of cut-off, together with the curve between $t_3$ and $t_4$, are characteristic of the action of the regulator and of its correct adjustment.

From $t_4$ to $t_5$, the values $d\omega/dt$, different from zero, are characteristic of the instabilities of the overspeed regulator.

From $t_5$ to $t_6$, the curve $\omega = f(t)$, its differential $d\omega/dt = h(t)$ and the formula $C_R = I o \cdot h(t)$ permit the determination of the passive resistive torque of the engine as a function of time. By eliminating the time variable, this torque is obtained as a function of the speed: $-C_R = 1(\omega)$.

The curve of the useful torque $C_U$ as a function of the speed must be compared with a reference curve obtained under the same conditions of test by a statistical method applicable to engines and vehicles of the same type as that under study.

The curve of useful torque is a dynamic characteristic comparable with other dynamic characteristics. On the other hand, the curves obtained on a test bench after thermal stabilization for each point of measurement, are only comparable with each other but not with a dynamic characteristic.

An analysis of the function of the resistive torque $C_R$ enables a qualitative and quantitative balance sheet of the passive resistances of the engine to be prepared. It is possible to separate the various resistances by studying the form of their variation with respect to $\omega$, which results in the two following large classes:

a. Solid friction.

The information utilizable from this study could be, for example:

Substantial friction — for an engine which is new or not run-in;

very low friction for a considerably work engine;

friction within normal limits — for an engine in good condition.

b. Viscous friction.

The information utilizable could be, for example:

Low friction — for an engine with an air filter blocked;

Considerable friction — for an engine having bad compression;

Engine provided with a non-standard fan;

Engine equipped with non-standard parts.

An analysis of the various terms of the function $-C_R = l(\omega)$ and their comparison with standard reference values permits a certain number of cross-checks which make it possible to increase the number of conclusions suggested by way of example.

Among the latter, there may be cited, in addition to the curves of useful driving torque and of resistive torque as a function of the speed of rotation:

Main adjustments of the injection system:
  Elimination of the starting up overload (by a study of the speed);
  Beginning of injection cut-off (by study of speed);
  End of injection cut-off (by study of speed);
  Stability of the overspeed regulator;
  Correct setting or correct operation of the automatic advance system at injection by a study of the form of $C_t = h(\omega)$ and of the general condition of the engine;
  Gas-tightness of the engine or number of defective cylinders;
  Condition of the injectors: good, or number of bad;
General condition of the engine:
  New, not run-in;
  Good and not much worn;
  Good with substantial wear;
  Bad, with considerable deterioration.
Other information relative to accessory conditions:
  Air filter choked;
  Engine fitted with parts not provided in normal production;
  Test made outside the prescribed conditions;
  Quality of oil not up to standard.

In order to extract the above results from the recording of speeds, use is made of a computer for treating the information collected.

Figure 6:
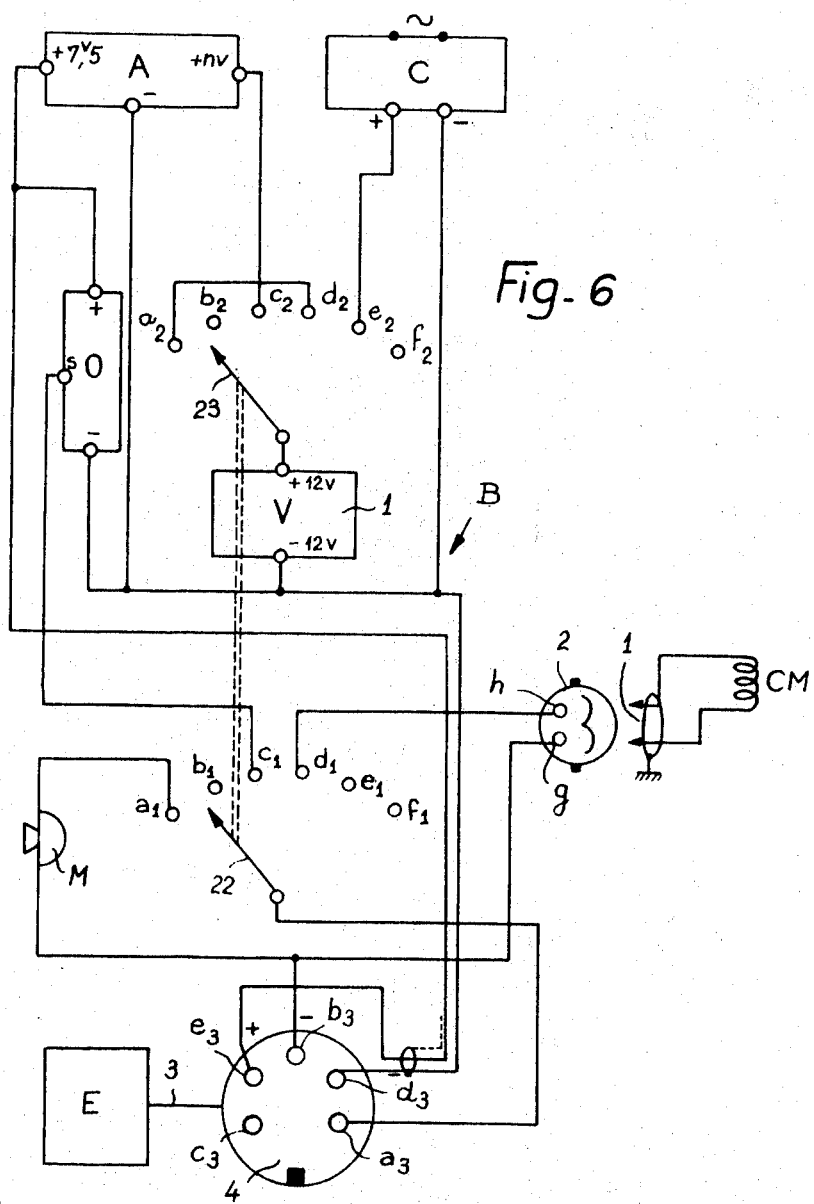
FIG. 6 shows an electrical diagram of the whole of the measuring device.

A device for carrying the method of the invention into effect in making measurements on a vehicle engine is shown in the diagram of FIG. 6. It comprises: an electro-magnetic detector CM, a portable adaptation box B and a recorder E of known type comprising a case with a magnetic tape. An electric cable connects the detector CM to a two-pin socket 2 of the casing B. A further cable 3 connects a multi-pin plug 4 on the same casing to the recorder E.

Figure 7:
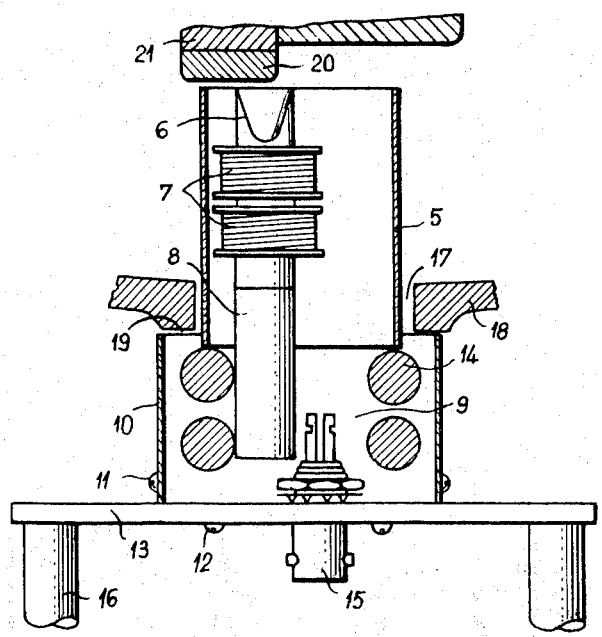
FIG. 7 shows the mounting of an electro-magnetic detector of the device.

As shown in FIG. 7, the electro-magnetic detector CM comprises, in a cylindrical socket 5, a pointed ferrite 6 on which are mounted the detector coils 7, and which is placed on a permanent magnet 8. This latter is partly enclosed in a casing formed by two opposite pole-plates 9 of mild steel, connected together by plates 10 by means of screws 11 and fixed by screws 12 to a supporting plate 13 of non-magnetic material. The pole-plates 9 retain cylindrical magnets 14 by which they are magnetized. A two-pin plug 15 permits the connection of the electric cable 1 and a handle 16 facilitates the operation of the detector.

When an operator effects the checking of an engine, he introduces the socket 5 of the detector, for example into an orifice 17 of the clutch casing 18, which serves as an evacuation hole for oil leaking from the rear bearing, which is provided on numerous types of engine. The pole-plates 9 of the detector form a magnetic base which fixes itself against one edge 19 of the casing. In an alternative form, the fixing of the detector may be effected by a rubber suction device (not shown).

When the detector is in position, its ferrite 6 is located opposite the teeth 20 of the starting pinion 21 of the engine. The point of the ferrite forms an air-gap with the teeth, and this air-gap varies when the wheel is driven in rotation. The electric signal caused by the variation of reluctance of the magnetic circuit of the detector is transmitted by the cable 1 to the input plug 2 of the casing B of FIG. 6. The frequency of the signal is proportional to the angular speed of the engine to be checked.

The casing houses the following members in a very small space:

a. A battery V, of 12 volts for example, with a known type of constant current charger C permitting re-charging of the battery from commercial supply;

b. A stabilized voltage supply device A of 7.5 volts for example, also of known type;

c. A quartz type calibration oscillator O, of a known type working on a fixed frequency, 10 kc/sec. for example, the recording of the signal from which permits, when the information is examined, the correction of the faults of winding and unwinding speeds inherent with ordinary low-cost magnetophones;

d. A microphone M permitting the recording of speech and in particular the information necessary for the examination of the results, for example the date, type of vehicle, its mileage, the name and address of the owner;

e. Two series of contact studs $a1, b1, c1, d1, e1, f1$ and $a2, b2, c2, d2, e2, f2$ which correspond to rotary cursors 22 and 23 respectively, rigidly fixed to each other for rotation.

The stud $a1$ is connected to a terminal of the microphone M, the other terminal of which is connected to a pin $b3$ of the multi-pin plug 4 and to the pin $g$ of the socket 2 to which is connected the terminal of the detector CM connected to earth. The stud $b1$ is a stop stud; the stud $c1$ is connected to the output $s_o$ of the oscillator 0. The stud $d1$ is connected to the pin $h$ of the socket 2 and receives the signal from the detector CM. The studs $e1$ and $f1$ are stop studs. The cursor 22 is connected to the pin $a3$ of the plug 4 which is connected by a cable 3 to the input of the recorder E. Two other pins $d3$ and $e3$ of the plug 4 are respectively connected to the positive and negative 7.5 V terminals of the supply device A, to which are also connected the corresponding terminals of the oscillator 0.

The studs $a2, c2$ and $d2$ of the second series are connected to the + 12 volts terminal of the supply device A. The stud $e2$ is connected to a positive terminal of the charger C, the negative terminal of which is connected to the negative terminal of the battery V, also connected to the negative terminal of the supply device A; the contact studs $b2$ and $f2$ are stop studs. The cursor 23 is connected to the positive terminal of the battery.

Figure 8:
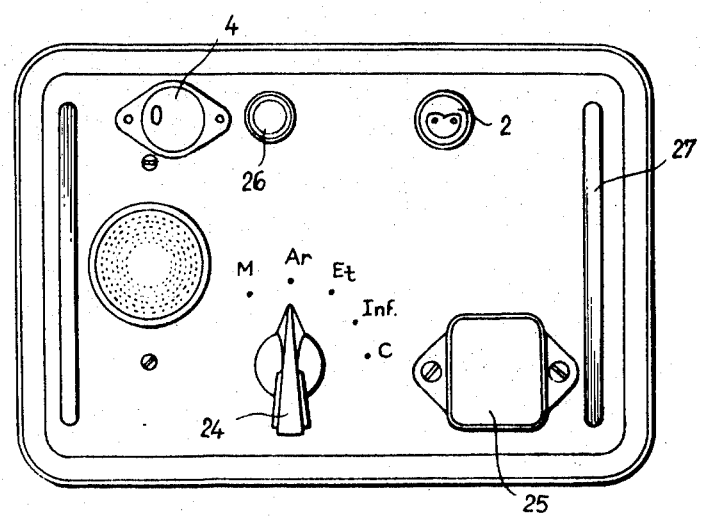
FIG. 8 shows the top of the cover of the adaptation casing of the apparatus.

The cursors 22 and 23 are operated, for example, by a handle 24 which is advantageously mounted on the cover of the casing B, as shown in FIG. 8. References for the microphone (M), stop (An), calibration (Et), information (I), load (C) indicate the various positions taken up by the cursors. The microphone M, the two pin-connectors 2 and 4 respectively for the input and output of the information; a socket 25 for coupling the charger C to the commercial and an indicator lamp 26 showing the end of charge of the battery are also fixed on the cover. Two side handles 27 are provided to facilitate handling.

The procedure of measurement according to the invention is carried out in the following manner: after having brought the engine to be checked to its normal working temperature, the operator stops it, places the electro-magnetic detector CM opposite the toothed ring 21 of the engine and connects it by the cable 1 to the socket 2 of the casing. He also connects the plug 4 to the magnetophone-recorder E loaded with a magnetic tape case.

The handle 24 of the casing B is first put into the position "microphone," indicated in the drawing by "M" and corresponding to the position of the cursor 22 on the stud $a1$. The operator then makes an announcement recorded on the tape of the magnetophone E, indicating the various characteristics of the engine. The handle 24 is then put in the calibration position indicated by "Et" which corresponds to the position of the cursor 22 on the stud $c1$. The signals from the oscillator 0 are then transmitted to the recorder E, after which the handle 24 is placed in the information position which corresponds to the position of the cursor 22 on the stud $d1$ and to the recording of the information transmitted by the electro-magnetic detector CM.

The operator then depresses to the maximum extent the clutch pedal and the accelerator pedal and actuates the starter until the engine starts up. He then waits until the engine has reached its maximum speed of rotation and actuates the "-

Stop" control which cuts off the supply of fuel. When the engine has completely stopped, the handle 24 of the casing is set on "Stop" (Ar) which stops the recording. It only remains for the operator to withdraw the detector so as to complete the operation, the total duration of which is of the order of 5 minutes.

The measuring device is light and easily transportable it is independent and can operate in any desired location. since it is simple to handle, its use is within the scope of everybody and does not necessitate the presence of a specialist.

The information of the measurements made, after having been recorded on the magnetic tape, can be directed to a computer in their actual state. They may also be transcribed on to a tape perforated with the code of telegraphic teleprinters so as to be transmitted by teleprinter to a center for treatment on a computer.

The results of the treatment of information by the computer can be supplied by the peripheries of this latter in various ways, depending on the use for which they are intended. In particular, it is possible to obtain:

1. Curves on an incremental drawing table and a table of numerical values of the measurements. The graphs representing the curves relative to the engine checked and the curves of a standard engine of the same type. The analysis of these curves is particularly valuable when the measurements are intended for the design and research of constructors. It may also be useful in statistical control of the product; in the supervision of the evolution of the characteristics of engines installed on a vehicle for endurance tests, or in order to have the characteristics of an engine in a transient thermal condition (temperature of the fluids not stabilized).

The analysis may also be employed in expert evidence in law cases.

2. A table of the values of the useful torque and of the resistive torque for a few values of the speed of rotation, expressed as a percentage of the standard values of a new engine of the same type.

The computer may then accompany the results by comments in ordinary language, for example:

New engine correctly adjusted or badly adjusted;
A worn engine correctly adjusted or badly adjusted;
An extremely worn engine well adjusted or badly adjusted;
Tests not valid: engine off-standard.

This type of result is generally intended for the purposes of preventive maintenance, without enquiring into the cause of a possible bad condition. These results may also be intended for the quotation of the price of second-hand machines.

In addition to its application to vehicle engines, the method can be employed for the measurement of friction torques in numerous rotating machines. These measurements may be employed for example in the study or in the periodic checks of the condition of bearings and other elements.

I claim:

1. A method for rapid and accurate determination of the performance of a vehicle engine by interpreting the driving and resistive torques of said engine, the method comprising placing a detector in the vicinity of a rotating member of the engine to emit electrical signals, the frequency of said signals being proportional to the angular speed of the engine; recording said signals on a magnetic tape of a recorder independent of said detector during first and second phases of operation of said engine which has first been brought to its normal operation temperature, the first phase recording acceleration beginning with starting the engine and lasting until maximum speed is attained by the engine with a given full flow of fuel being maintained during this phase, the second phase recording deceleration lasting from maximum speed to complete stopping of said engine and commencing with suddenly cutting off the flow of fuel to the engine, said detector signals being recorded in a continuous manner on said magnetic tape during said two phases from start to stop of the engine; transmitting the recorded signals on said magnetic tape to a computer having a program of established ideal parameters and enabled to calculate the angular speed, and derivatives thereof as a function of the time, of the engine corresponding to said signals in the acceleration phase and in the deceleration phase, and to establish tables and curves of the acceleration and of the driving torques corresponding to said first phase and resistive torques and deceleration corresponding to said second phase as a function of said angular speed relative to said established parameters whereby the condition of said engine can be diagnosed.

2. A method according to claim 1, further comprising recording on said magnetic tape of said recorder signals emitted with a predetermined reference frequency by a precision frequency calibrating electronic oscillator, said oscillator recorder signals permitting said computer treating the recorded signals to make corrections for speed and unwinding faults inherent within said recorder.

* * * * *